(12) United States Patent
Beever et al.

(10) Patent No.: US 9,387,841 B2
(45) Date of Patent: Jul. 12, 2016

(54) BRAKE CONTROL

(75) Inventors: Paul Beever, Whitley (GB); Theodor Cassell, Whitley (GB); Richard Cook, Bromsgrove (GB); Timothy Reynolds, Warwick (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 144 days.

(21) Appl. No.: 13/825,319

(22) PCT Filed: Sep. 19, 2011

(86) PCT No.: PCT/EP2011/066180
§ 371 (c)(1),
(2), (4) Date: Aug. 19, 2013

(87) PCT Pub. No.: WO2012/038365
PCT Pub. Date: Mar. 29, 2012

(65) Prior Publication Data
US 2013/0332042 A1 Dec. 12, 2013

(30) Foreign Application Priority Data
Sep. 20, 2010 (GB) .................................. 1015727.9

(51) Int. Cl.
*B60T 7/12* (2006.01)
*B60T 8/24* (2006.01)
*B60T 8/171* (2006.01)

(52) U.S. Cl.
CPC .................. *B60T 8/171* (2013.01); *B60T 7/122* (2013.01); *B60T 8/245* (2013.01); *B60T 2201/06* (2013.01); *B60T 2230/08* (2013.01); *B60T 2260/04* (2013.01); *Y10T 477/647* (2015.01)

(58) Field of Classification Search
CPC ....... B60T 8/17; B60T 8/1755; B60T 13/746; B60T 8/1766; B60W 10/18; B60W 10/184; B60W 10/182; B60L 7/18; B60L 7/26; B60L 2240/423; B60L 15/2009; B60L 15/2018; G01S 2013/9346; Y10S 903/947
See application file for complete search history.

(56) References Cited

U.S. PATENT DOCUMENTS

| 6,086,515 A | 7/2000 | Buschmann et al. |
| 7,762,633 B2 * | 7/2010 | Maskell .................. B60T 7/122 303/192 |

(Continued)

FOREIGN PATENT DOCUMENTS

| CN | 1993257 A | 7/2007 |
| CN | 101497335 A | 8/2009 |

(Continued)

OTHER PUBLICATIONS

International Search Report for PCT/EP2011/066180 dated Dec. 22, 2011, 4 pages.

(Continued)

*Primary Examiner* — James Trammell
*Assistant Examiner* — Demetra Smith-Stewart
(74) *Attorney, Agent, or Firm* — Reising Ethington P.C.

(57) ABSTRACT

A brake control system for a motor vehicle having a plurality of wheels, brakes for applying a braking force to one or more of the wheels, sensing means for detecting movement of the vehicle, and one or more selectable drive gears each associated with an intended direction of movement of the vehicle. The system comprises: brake actuation means for actuating the brakes to supply a braking effort; and brake control means for controlling the brake actuation means, wherein the brake control means is arranged to detect the selection of a drive gear and, when a drive gear is selected, to limit a movement of the vehicle in a direction opposed to the intended direction of movement associated with the selected drive gear by ensuring that the brake actuation means supplies a braking effort.

18 Claims, 3 Drawing Sheets

(56) References Cited

U.S. PATENT DOCUMENTS

| | | | |
|---|---|---|---|
| 7,934,589 B2* | 5/2011 | Groner et al. | 192/219.1 |
| 7,979,190 B2* | 7/2011 | Ohmori et al. | 701/70 |
| 8,123,659 B2* | 2/2012 | Leibbrandt et al. | 477/175 |
| 8,145,374 B2* | 3/2012 | Farnsworth | 701/22 |
| 8,412,436 B2* | 4/2013 | Mallet et al. | 701/83 |
| 8,649,948 B2* | 2/2014 | Yanagida et al. | 701/51 |
| 8,833,870 B2* | 9/2014 | Kish et al. | 303/192 |
| 8,849,534 B2* | 9/2014 | Saito | 701/70 |
| 9,085,285 B2* | 7/2015 | DeVlieg | B60T 8/00 |
| 2002/0029943 A1* | 3/2002 | Totsuka et al. | 188/113 |
| 2004/0024513 A1 | 2/2004 | Aizawa et al. | |
| 2004/0050633 A1* | 3/2004 | Grupp et al. | 188/296 |
| 2005/0017580 A1* | 1/2005 | Cikanek et al. | 303/191 |
| 2006/0079377 A1* | 4/2006 | Steen et al. | 477/186 |
| 2007/0299581 A1 | 12/2007 | Torralbo et al. | |
| 2009/0124457 A1 | 5/2009 | Nitta et al. | |
| 2009/0299557 A1* | 12/2009 | Farnsworth | 701/22 |
| 2010/0004095 A1* | 1/2010 | Sokoll | 477/198 |
| 2010/0138123 A1 | 6/2010 | Tokimasa et al. | 701/70 |
| 2012/0161508 A1* | 6/2012 | Beever et al. | 303/191 |
| 2012/0209490 A1* | 8/2012 | Lu et al. | 701/78 |
| 2014/0067224 A1* | 3/2014 | Yu et al. | 701/70 |

FOREIGN PATENT DOCUMENTS

| | | |
|---|---|---|
| CN | 101678821 A | 3/2010 |
| CN | 103118909 A | 5/2013 |
| DE | 19525552 | 1/1997 |
| DE | 19545010 | 6/1997 |
| EP | 0784551 | 3/1999 |
| EP | 1008503 | 6/2000 |
| EP | 1777133 | 4/2007 |
| EP | 2082933 | 7/2009 |
| EP | 2619053 A1 | 7/2013 |
| GB | 2377475 | 1/2003 |
| GB | 2483719 A | 3/2012 |
| JP | H11508516 A | 7/1999 |
| JP | 2003137080 | 5/2003 |
| JP | 2009113712 A | 5/2009 |
| JP | 2010035830 | 2/2010 |
| JP | 2013537144 A | 9/2013 |
| WO | WO2012038365 A1 | 3/2012 |

OTHER PUBLICATIONS

English language summary of Japan Office Action corresponding to Japanese Patent Application No. 2013-528696, dated Mar. 31, 2015, 2 pages.

English Translation of Chinese Office Action with Search Report corresponding to Chinese Application No. 201180045075.6, dated Oct. 10, 2014, 7 pages.

Japanese Office action and English summary corresponding to JP application No. 2013-528696, dated Nov. 24, 2015, 5 pages.

\* cited by examiner

BRAKE CONTROL

TECHNICAL FIELD

The present invention relates to a brake control system for a motor vehicle. In particular, though not exclusively, it relates to a brake control system for facilitating the control of a motor vehicle on a slope. Aspects of the invention relate to a system, to a method and to a vehicle.

BACKGROUND

There are a number of existing brake control systems for facilitating the control of motor vehicles on slopes.

EP 0 784 551 B1 discloses a brake control system comprising a hill descent mode in particular for vehicles used in off-road conditions. The brake control system comprises an electronic control unit and a brake control system to control brakes associated with each wheel of the vehicle. A driver interface in the form of a switch is used to cause the control unit to enter a hill descent mode when the vehicle is also detected to be in gear. In this mode the control unit controls the speed of the vehicle in an intended direction by braking to slow the vehicle when a detected vehicle speed is above a preset target speed.

When driving a motor vehicle off road it might be necessary to come to a standstill on a slope. In this context, EP 1 777 133 A1 discloses a brake control system in which a brake control means is arranged to detect when the vehicle is stationary and is held on a slope by a braking effort supplied by brakes in accordance with the operation of a brake command means (such as a brake pedal). The release of the braking effort is controlled as a function of the steepness of the slope following operation of the brake command means to release the brakes.

Whilst the brake control system of EP 1 777 133 A1 helps to smooth transition from a stationary position to hill descent in an intended direction, it does not address another challenge that is associated with driving a motor vehicle on a slope.

It might be necessary when driving a motor vehicle to stop on a slope and then move off again in an uphill direction. This may occur, for example, when it is desired to change the drive direction from downhill movement of the vehicle to uphill movement by switching from a forward gear to a reverse gear or vice versa. Particularly on a steep slope, this manoeuvre, commonly referred to as a "hill start", can be difficult to execute for inexperienced drivers. There is a danger of driver misjudgement, which can lead to a loss of control over the vehicle, for example in the form of unintended rolling of the vehicle down the slope.

It is an aim of this invention to provide an improved brake control system that overcomes or minimises the above problem. Other aims and advantages of the invention will become apparent from the following description, claims and drawings.

SUMMARY OF THE INVENTION

Aspects of the invention therefore provide a system, a method and a vehicle as claimed in the appended claims.

According to another aspect of the invention for which protection is sought, there is provided a brake control system for a motor vehicle having a plurality of wheels, brakes for applying a braking force to one or more of the wheels, sensing means for detecting movement of the vehicle, and one or more selectable drive gears each associated with an intended direction of movement of the vehicle, the system comprising: brake actuation means for actuating the brakes to supply a braking effort; and brake control means for controlling the brake actuation means, wherein the brake control means is arranged to detect the selection of a drive gear and, when a drive gear is selected, to limit a movement of the vehicle in a direction opposed to the intended direction of movement associated with the selected drive gear by ensuring that the brake actuation means supplies a braking effort.

By limiting a movement of the vehicle in a direction opposed to the intended direction of movement (i.e. in an unintended direction, typically downhill) the brake control system according to the first aspect of the invention greatly enhances driver control over the vehicle, especially in the context of driving on a slope, e.g. off road.

Limiting the movement may comprise seeking to prevent the movement altogether. Thus the brake control means may be arranged to ensure that, when the vehicle is braked to a halt by a driver, the brake actuation means supplies a braking effort to counteract (ideally to prevent) movement of the vehicle in a direction opposed to the intended direction of movement associated with the selected gear.

In this manner movement in an unintended direction can generally be avoided entirely. However, it will be appreciated that under extreme slope conditions even the maximum braking effort that can be supplied by the brakes may not be enough to prevent movement.

The system may comprise a driver brake pedal and a brake pedal position sensor in communication with the brake control means. In some cases driver input will obviate the need for additional braking effort in which case the brake control means simply monitors the braking effort. Thus the brake control means may preferably only add to the supply of braking effort when the relevant braking effort is not already being provided by input from a driver, e.g. though a brake pedal. In the present invention braking effort may advantageously be supplied as needed to supplement driver input. Braking effort is preferably supplied to all wheels of the vehicle.

Advantageously, the brake control means may be arranged to ensure the braking effort for a predetermined time limit after the vehicle is braked to a halt (e.g. by 0.5 to 5 seconds, preferably 1 to 3 seconds). The brake control means may be arranged to detect the application of drive torque to the selected gear (based on a monitored accelerator/throttle pedal position) and to extend the predetermined time limit (e.g. by 0.5 to 5 seconds, preferably 1 to 3 seconds) if the applied drive torque is below a predetermined level. The predetermined level may correspond to the level of drive torque required to maintain the vehicle in standstill without any braking effort, and may optionally be calculated dynamically based on a detected gradient of the vehicle and/or the selected gear.

The system may also be responsive to parking brake status and may hence comprise, or operate in conjunction with, a parking brake and a parking brake position sensor connected to the brake control means. The brake control means may be arranged to end the braking effort in response to the application of a parking brake of the vehicle. Similarly, for additional safety, the brake control means may be arranged to end the braking effort in response to the opening of a door of the vehicle. The brake control means may comprise a single electronic control unit, or may alternatively comprise a plurality of units or modules.

The brake control means may additionally or alternatively be arranged to ensure that the brake actuation means supplies a braking effort when the vehicle moves at a speed in excess of a predetermined speed limit in a direction opposed to the intended direction of movement associated with the selected gear (i.e. in an unintended direction, typically downhill). In this manner, excessive movement in an unintended direction can be prevented, making recovery more manageable for the driver, for example by preventing a stall of the engine of the vehicle. A speed limit below 5 km/h is preferred to prevent stalls.

For similar reasons, the brake control means may be arranged to ensure that the brake actuation means supplies a braking effort when the vehicle moves at an acceleration in excess of a predetermined acceleration limit in a direction opposed to the intended direction of movement associated with the selected gear. An acceleration of less than 1 ms$^{-2}$ is preferred.

Conveniently, the brake control means may be arranged to determine the gradient of the vehicle. To this end the system may comprise, or operate in conjunction with, a gradient sensor connected to the brake control means. The speed limit and/or acceleration limit may advantageously be predetermined dynamically, in an inverse relationship with the detected gradient, for example based on a lookup table.

The system may comprise, or operate in conjunction with, a driver accelerator (or throttle) pedal and an accelerator pedal position sensor connected to the brake control means to allow the brake control means to detect the application of drive torque to the selected gear. Thus, the brake control means may be arranged to detect the application of drive torque to the selected gear (based on a monitored accelerator pedal position) and to release the braking effort supplied by the brake actuation means when the detected drive torque exceeds a predetermined level. The predetermined level may correspond to the level of drive torque required to maintain the vehicle in standstill without any braking effort, and may optionally be calculated dynamically based on a detected gradient of the vehicle and/or the selected gear.

The brake control system may have activated and deactivated states and may comprise a user interface for switching between the activated and deactivated states. To enhance safety, the activation state of the system may be independent from the activation state of a drive engine of the vehicle. This ensures that a stall of the engine does not compromise the system.

The braking effort ensured by the brake control means may additionally or alternatively be determined based on the gradient of the vehicle, i.e. the gradient of the slope on which the vehicle is supported. For example, the brake control means may be arranged to detect the gradient of the vehicle and to cause the brake actuation means to supply a braking effort to limit movement of the vehicle in a downhill direction (intended and/or unintended). Limitation in this context may refer to maintaining standstill as described above and/or restricting movement within speed and/or acceleration limits as described above.

The brake control system may be integral or function in conjunction with other brake control systems, for example such as those described in EP 0 784 551 B1 and/or EP 1 777 133 A1.

According to a further aspect of the invention for which protection is sought, there is provided a method for controlling the brakes of a motor vehicle, the method comprising: detecting the selection of a vehicle drive gear having an associated intended direction of movement of the vehicle; detecting a driver brake input (if any), and limiting a movement of the vehicle in a direction opposed to the intended direction of movement associated with the selected drive gear by supplying a braking effort to supplement the driver brake input.

According to a still further aspect of the invention for which protection is sought, there is provided a motor vehicle comprising a brake control system according to the first aspect of the invention.

Within the scope of this application it is envisaged that the various aspects, embodiments, features, examples and alternatives set out in the preceding paragraphs, in the claims and/or in the following description and drawings may be taken independently or in any combination. The features and advantages recited in respect of one aspect of the invention apply mutatis mutandis to any other aspect of the invention, except where there is an incompatibility of features.

BRIEF DESCRIPTION OF THE DRAWINGS

The invention will now be described by way of example with reference to the accompanying drawings of which.

DETAILED DESCRIPTION

Figure 1:
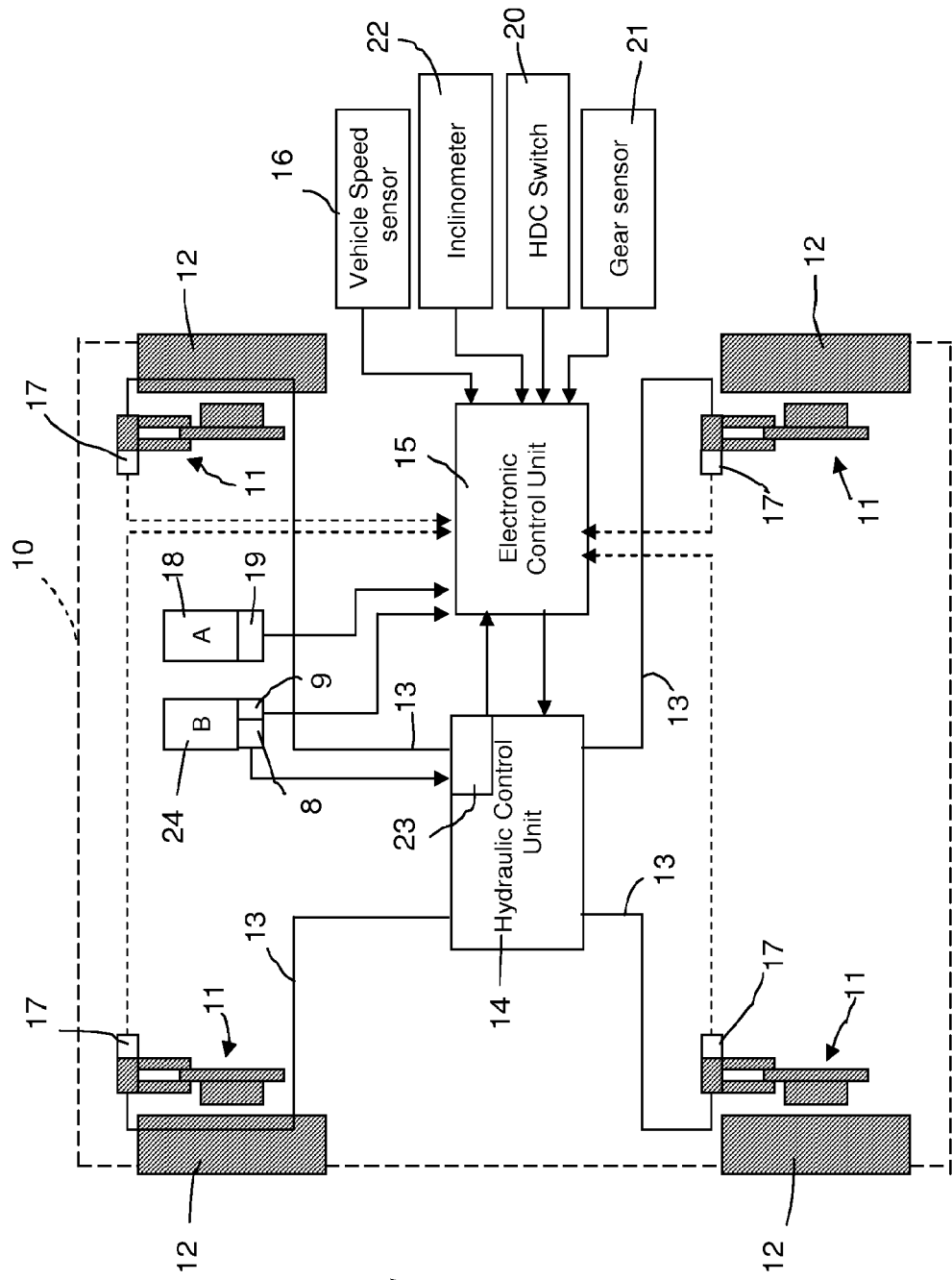
FIG. 1 is a schematic drawing of a brake control system for a motor vehicle embodying a first form of the present invention.

Referring to FIG. 1, there is shown a motor vehicle 10 in a dashed outline with a brake control system having a hill descent mode, according to a first embodiment of the invention.

When the hill descent mode is activated, the brake control system is in an activated state for the purpose of the invention. By contrast, when the hill descent mode is deactivated, the brake control system is deactivated for the purpose of the invention. The brake control system may additionally perform other brake functions not related to the invention, such those described in EP 0 784 551 B1 or EP 1 777 133 A1.

The brake control system includes in a conventional manner a braking arrangement with a disc brake 11 on each of four wheels 12. Each disc brake 11 is hydraulically operated through a hydraulic line 13 by a brake hydraulic control (HC) unit 14 which functions as a brake actuation means. The HC unit 14 is controlled by an electronic control (EC) unit 15, which functions as a brake control means. FIG. 1 is only a diagram of the most important functional components of the brake control system in accordance with the invention. Further details of the brake control system are described in EP 0 784 551 B1 and are included in the description by reference and thus will not be further described.

The EC unit 15 receives a vehicle speed signal from sensing means in the form of a vehicle speed sensor 16, an individual wheel speed signal from a wheel speed sensor 17 on each wheel 12 and a driver demand signal from an accelerator (or throttle) pedal 18, which incorporates an accelerator pedal position sensor 19. The EC unit 15 also receives a hill descent signal from a driver hill control switch 20, a gear signal from a drive gear sensor 21 and an inclination angle signal from a gradient sensing means, in this example an inclinometer 22. The EC unit 15 receives a pedal braking signal from a brake light switch 9 on a brake pedal 24.

The brake pedal 24 is also associated with a master cylinder 8, which is connected to a brake pressure sensor 23 forming part of the HC unit 14. The brake pressure sensor 23 is arranged to send a driver braking signal from the brake pressure sensor 23 to the EC unit 15.

The EC unit 15 is active to control the HC unit 14 whenever the hill control switch 20 is switched on by the driver to select hill descent mode. The EC unit can operate in conjunction with (i.e. to supplement) operator inputs from the brake and accelerator pedals 24, 18.

When driving the motor vehicle 10 it may be desired to stop on a slope and then move off again in an uphill direction. This may occur, for example, when it is desired to change the drive direction from downhill movement of the vehicle to uphill movement by switching from a forward gear to a reverse gear or vice versa. Particularly on a steep slope, this manoeuvre, commonly referred to as a "hill start", can be difficult to execute for inexperienced drivers.

To assist drivers with "hill start" manoeuvres and to improve control over the vehicle, when the hill descent mode is activated, the EC unit 15 is configured (arranged) firstly to detect the selection of a drive gear via gear sensor 21 and to determine the intended direction of travel (i.e. forwards or backwards). If a gear is selected, the EC unit 15 then limits movement of the vehicle in a direction opposed to the intended direction of movement associated with the selected drive gear (i.e. the unintended direction, typically downhill) by ensuring that the HC unit 14 supplies a braking effort.

Specifically, with reference to FIG. 2, the EC unit 15 is configured to monitor vehicle movement status with the help of the vehicle speed sensor 16 and the brake pressure sensor 23, and to limit movement of the vehicle as follows:

i. If the vehicle is braked to a halt, movement in the unintended direction is prevented for a predetermined time; and ii. If the vehicle is moving in the unintended direction, the speed and acceleration of movement of the vehicle is limited to a predetermined limit.

These operational modes of the brake control system will be described in further detail with reference to the flow chart of FIG. 2.

The first operational mode illustrated on the left of the flow chart is entered when the EC unit 15 determines from the vehicle speed sensor 16 and the brake pressure sensor 23 that the vehicle has been braked to a halt. In such an event, the EC unit 15 checks with the inclinometer 22 whether the intended direction of travel, which has already been determined with the help of the gear sensor 21, is uphill.

If the intended direction of travel is not uphill, the EC unit 15 takes no further action and reverts to monitoring the vehicle movement status. As aforesaid, other hill descent features such as those described in EP 0 784 551 B1 or EP 1 777 133 A1 may be performed in the meantime.

If on the other hand the intended direction of travel is uphill then the EC unit 15 proceeds to monitor, based on the accelerator pedal position sensor 19, whether the driver is applying drive torque above a predetermined level. The predetermined level is determined dynamically and represents an approximation of the drive torque required to hold the vehicle stationary in the selected gear, without the application of brakes.

If the drive torque applied by the selected gear is found to exceed the predetermined level then the EC unit 15 assumes that the vehicle will be held in position or move off by drive torque alone. Thus the EC unit 15 takes no further action and reverts to monitoring the vehicle movement status.

If on the other hand the drive torque applied by the selected gear is found to be below the predetermined level then the EC unit 15 continues to monitor the applied drive torque and simultaneously checks whether sufficient braking effort is being supplied to hold the vehicle stationary. If the supplied brake effort (if any) is insufficient then the EC unit 15 causes the HC unit 14 to supply requisite additional braking effort, which is held for a predetermined time limit, e.g. 2 seconds. When the time limit has elapsed, the braking effort caused by the EC unit 15 is released (i.e. typically ramped out).

In a variant (shown partly in dashed lines in FIG. 2), instead of releasing the braking effort when the time limit has elapsed, the EC unit falls back to monitoring of whether a torque is applied, and, if the applied drive torque exceeds a predetermined minimum but remains below the predetermined limit, extends the predetermined time limit, e.g. by a further 3 seconds. In this variant the braking effort caused by the EC unit 15 is released once the drive torque applied by the selected gear is found to exceed the predetermined level, or to fall below the predetermined minimum.

The braking effort supplied by the EC unit 15 in the first operational mode can be overridden at any time by the application of a parking brake (now shown), in which case the braking effort caused by the EC unit 15 is released. Similarly, for additional safety, the first operational mode can be overridden by opening a door of the vehicle, which the EC unit detects through a door sensor (not shown).

Figure 2:
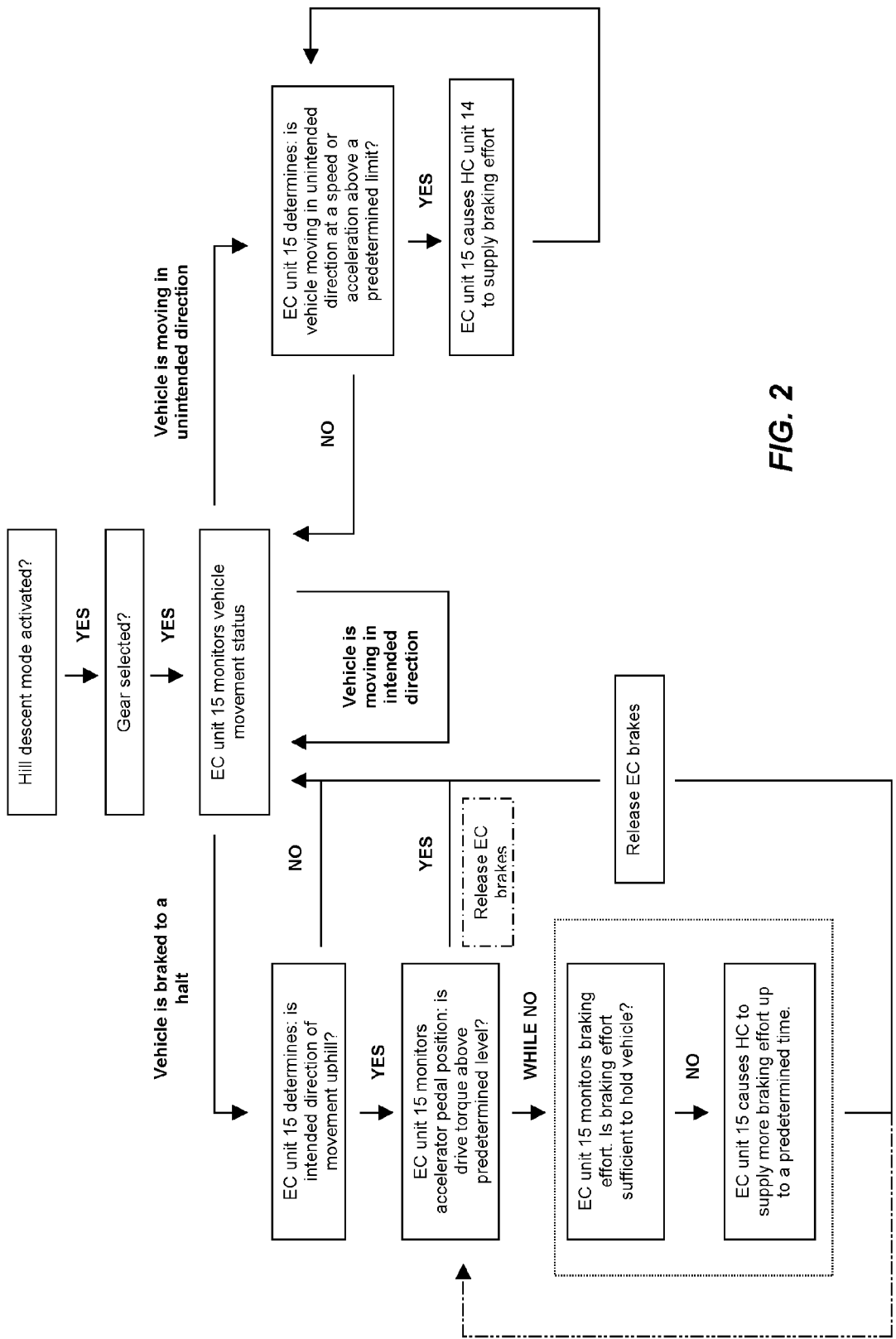
FIG. 2 is a flowchart summarising the working of the brake control system of FIG. 1.

The second operational mode illustrated on the right of the flow chart of FIG. 2 is entered when the EC unit determines from the vehicle speed sensor 16 that the vehicle is moving in the unintended direction. Typically such movement occurs when the vehicle is rolling down a slope, for example after the brakes have been released in the first operational mode, or if a driver removes or reduces drive torque during uphill movement without use of the brake pedal (i.e. the vehicle is not braked to a halt).

In the second operational mode, the EC unit 15 checks continuously whether the vehicle is moving in the unintended direction at a speed or acceleration above respective predetermined limits. If either the speed or the acceleration (or both) are above their predetermined limit then the EC unit 15 sends a command to the HC unit 14 to apply and maintain a suitable braking force to bring the speed and/or acceleration of the vehicle within the predetermined limits.

The second operational mode comes to an end when the vehicle stops moving in the unintended direction.

Figure 3:
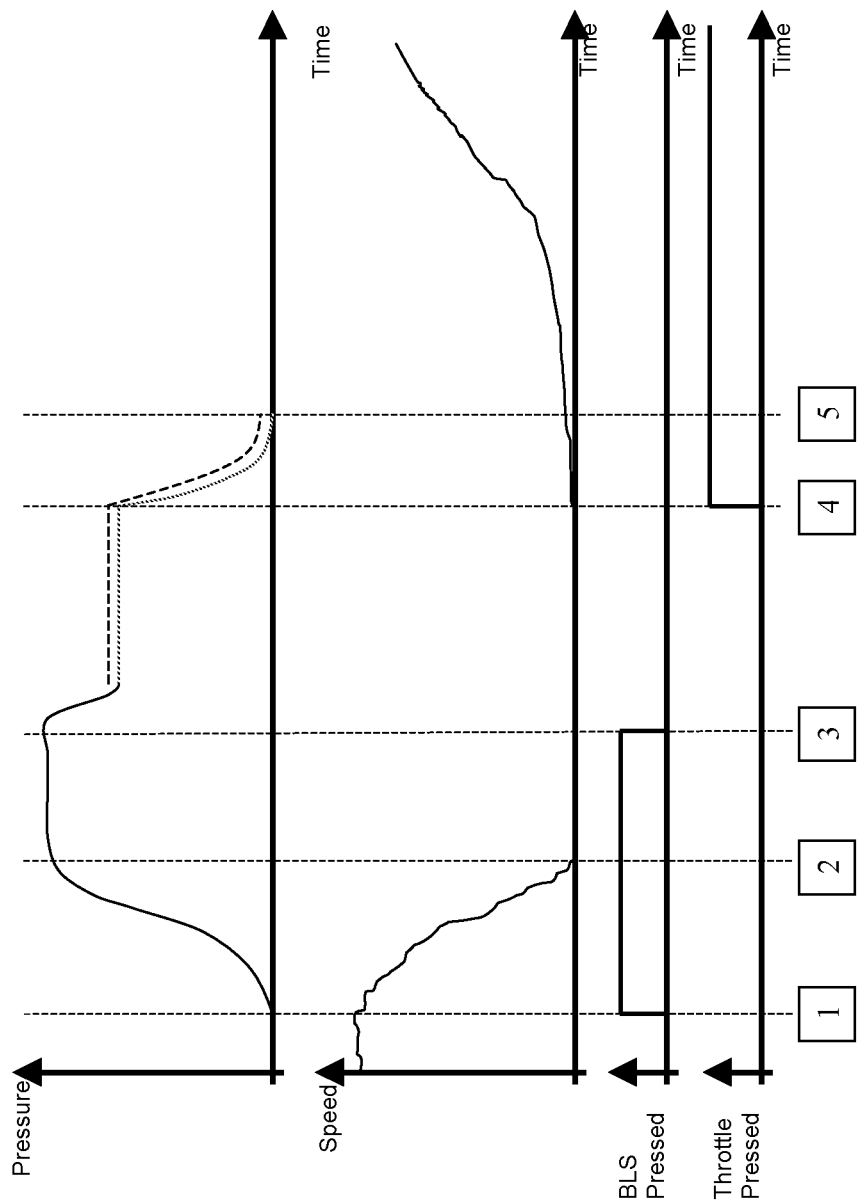
FIG. 3 is a graph of time-line plots illustrating the working of the brake control system of FIGS. 1 and 2 in an exemplary scenario.

FIG. 3 and shows time-line plots that illustrate the first operational mode of the brake control system. In these plots, which show various values plotted against time (t), the line "Pressure" shows the hydraulic brake pressure at the wheels, the line "Speed" shows the vehicle speed, the line "BLS pressed" shows the driver braking effort as measured by the brake pressure sensor 23, and the line "Throttle pressed" shows the driver acceleration effort as measured by the accelerator pedal position sensor 19.

FIG. 3 illustrates a scenario in which, at (1), a driver, driving the motor vehicle uphill, begins to brake to bring the vehicle to standstill (2). He continues to hold the brake pedal down to hold the vehicle on the slope. At (3) he releases the brake pedal. The brake control system takes control and maintains sufficient brake pressure to hold the vehicle on the slope (system controlled brake pressure is shown augmented by a dashed line for illustration). At (4), the driver starts to pull away and the brake control system ramps out its held pressure until the vehicle is fully under the driver's control (5). The vehicle ascends the slope under the driver's control.

The following further operational examples are provided to illustrate the first embodiment of the invention:

Vehicle stationary on hill, driver holding vehicle with the brake pedal, then performs hill start to continue ascent. The vehicle is facing uphill in a forward gear, or downhill in a reverse gear. It is held on the hill by the driver using the brake pedal. The driver releases the brake pedal and moves his foot across to the throttle pedal. The brake control system holds the vehicle stationary as the driver moves his foot from the brake to the throttle pedal. The driver applies the sufficient throttle pedal to allow a climb and the vehicle moves forward. As the brake control system sees the build up of drive torque, it ends its hold period and releases the brake pressure to allow a hill start with no vehicle roll back.

Vehicle ascending hill, comes to rest without driver using brakes. The vehicle is being driven up a hill, either forward in a forward gear or backwards in a reverse gear. The driver releases the throttle pedal and does not apply any other pedals or controls. The vehicle comes to rest (the creep torque is not sufficient to maintain vehicle motion), and immediately begins to roll back down the hill against the selected gear. Vehicle speed is limited to 5 km/h and an acceleration of 0 ms$^{-2}$ above this speed for 20-30 seconds, during which time the driver has chance to apply the throttle or brakes.

Vehicle stationary on hill, driver holding vehicle with the brake pedal, then releases all pedals. The vehicle is facing uphill in a forward gear, or downhill in reverse gear. It is held on the hill by the driver using the brake pedal. The driver releases the brake pedal but does not move his foot across to the throttle pedal. The brake control system holds the vehicle stationary for two seconds after which time the pressure is ramped out and the vehicle starts to roll down the hill. Vehicle speed is limited to 5 km/h and an acceleration of 0 ms$^{-2}$ above this speed for 20-30 seconds, during which time the driver has chance to apply the throttle or brakes.

Vehicle is stationary on a slope, driver holding vehicle with the brake pedal, and brake control system goes active. The vehicle is facing uphill in a forward gear or downhill in reverse gear. Then the driver release the brake pedal and the vehicle is held by the brake control system. After that the driver changes the gear position to neutral. The brake control system releases (ramps out) the hold pressure.

Vehicle is stationary on a slope, driver holding vehicle with the brake pedal, and brake control system goes active. The vehicle is facing downhill/uphill. Then the driver release the brake pedal and the vehicle is held by the brake control system. While the brake control system is active the driver applies the parking brake. The brake control system releases (ramps out) the hold pressure.

The invention claimed is:

1. A brake control system for a motor vehicle having a plurality of wheels, brakes for applying a braking force to one or more of the wheels, sensing means for detecting movement of the vehicle, and one or more selectable drive gears each associated with an intended direction of movement of the vehicle, the system comprising: brake actuation means for actuating the brakes to supply a braking effort; and brake control means for controlling the brake actuation means, wherein the brake control means is arranged to detect the selection of a drive gear and to limit a movement of the vehicle in a direction opposed to the intended direction of movement associated with the selected drive gear by ensuring that the brake actuation means supplies a braking effort,
   wherein the brake control means is arranged to control the brake actuation means such that the braking effort being supplied by the brake actuation means is supplied for a predetermined time limit following the detection of the selection of the drive gear.

2. The brake control system of claim 1, wherein the brake control means is arranged to ensure that, when the vehicle is braked to a halt, the brake actuation means supplies a braking effort to prevent movement of the vehicle in a direction opposed to the intended direction of movement associated with the selected gear.

3. The brake control system of claim 2, wherein the brake control means is arranged to ensure the braking effort for a predetermined time limit after the vehicle is braked to a halt.

4. The brake control system of claim 1, wherein the brake control means is arranged to end the braking effort if a parking brake of the vehicle is applied and/or when a door of the vehicle is opened.

5. The brake control system of claim 1, wherein the brake control means is arranged to ensure that the brake actuation means supplies a braking effort when the vehicle moves at a speed in excess of a predetermined speed limit in a direction opposed to the intended direction of movement associated with the selected gear.

6. The brake control system of claim 5, wherein the brake control means is arranged to detect the gradient of the vehicle and wherein the speed limit is predetermined dynamically in an inverse relationship with the detected gradient.

7. The brake control system of claim 1, wherein the brake control means is arranged to ensure that the brake actuation means supplies a braking effort when the vehicle moves at an acceleration in excess of a predetermined acceleration limit in a direction opposed to the intended direction of movement associated with the selected gear.

8. The brake control system of claim 7, wherein the brake control means is arranged to detect the gradient of the vehicle and wherein the acceleration limit is predetermined dynamically in an inverse relationship with the detected gradient.

9. The brake control system of claim 1, wherein the brake control means is arranged to detect the application of drive torque by the selected gear and to release the braking effort supplied by the brake actuation means when the detected drive torque exceeds a predetermined level.

10. The brake control system of claim 1, having activated and deactivated states.

11. The brake control system of claim 10 wherein the activation state of the system is independent from the activation state of a drive engine of the vehicle.

12. The brake control system of claim 1, wherein the brake control means is arranged to detect the gradient of the vehicle and to cause the brake actuation means to supply a braking effort to limit movement of the vehicle in a downhill direction.

13. A vehicle having the system of claim 1.

14. A brake control system for a motor vehicle having a plurality of wheels, brakes for applying a braking force to one or more of the wheels, sensing means for detecting movement of the vehicle, and one or more selectable drive gears each associated with an intended direction of movement of the vehicle, the system comprising: brake actuation means for actuating the brakes to supply a braking effort; and brake control means for controlling the brake actuation means, wherein the brake control means is arranged to detect the selection of a drive gear and to limit a movement of the vehicle in a direction opposed to the intended direction of movement associated with the selected drive gear by ensuring that the brake actuation means supplies a braking effort,
   wherein the brake control means is arranged to control the brake actuation means such that the braking effort being supplied by the brake actuation means is supplied for a predetermined time limit following the detection of the selection of the drive gear,
   and further wherein brake control means is arranged to detect the application of drive torque by the selected gear and to extend the predetermined time limit if the applied drive torque is below a predetermined level.

15. A method for controlling the brakes of a motor vehicle the method comprising:

detecting the selection of a vehicle drive gear having an associated intended direction of movement of the vehicle; detecting a driver brake input, and limiting a movement of the vehicle in a direction opposed to the intended direction of movement associated with the selected drive gear by supplying a braking effort to supplement the driver brake input; and supplying the braking effort for a predetermined time limit following the detection of the selection of the drive gear.

16. The method of claim 15 comprising, when the vehicle is braked to a halt, supplying the braking effort to prevent movement of the vehicle in a direction opposed to the intended direction of movement associated with the selected gear.

17. The method of claim 15 comprising supplying the braking effort when the vehicle moves at a speed or acceleration in excess of a predetermined speed or acceleration limit in a direction opposed to the intended direction of movement associated with the selected gear.

18. A vehicle adapted to use the method of claim 15.

* * * * *